United States Patent

Tanaka et al.

[15] 3,672,044

[45] June 27, 1972

[54] MULTI-CHANNEL DUAL-GAP MAGNETIC HEAD

[72] Inventors: Takashi Tanaka, Osaka; Yasuo Nomura, Nishinomiya, both of Japan

[73] Assignee: Matsushita Electric Industrial Co., Ltd., Kadoma, Osaka, Japan

[22] Filed: March 4, 1970

[21] Appl. No.: 16,320

[30] Foreign Application Priority Data

March 10, 1969 Japan....................................44/19680

[52] U.S. Cl. ..........................................29/603, 179/100.2 C

[51] Int. Cl. ..........................................G11b 5/42, H01f 7/06

[58] Field of Search ..............................29/603; 179/100.2 C; 346/74 MC; 340/174.1 F

[56] References Cited

UNITED STATES PATENTS

| | | | |
|---|---|---|---|
| 3,543,396 | 12/1970 | Illg et al. | 29/603 |
| 3,246,383 | 4/1966 | Peloschek et al. | 29/603 |
| 3,353,261 | 11/1967 | Bradford et al. | 29/603 |
| 3,402,463 | 9/1968 | Bos et al. | 29/603 |

*Primary Examiner*—John F. Campbell
*Assistant Examiner*—Carl E. Hall
*Attorney*—Wenderoth, Lind & Ponack

[57] ABSTRACT

A multi-channel dual-gap magnetic head. The head has a plurality of magnetic head tips which are separated magnetically from each other by non-magnetic materials and each having two magnetic gaps. A plurality of magnetic back cores are connected to said magnetic head tips, and a plurality of windings are wound on the respective back cores. The corresponding magnetic gaps in the head tips are aligned in two straight lines which are parallel to each other and perpendicular to the direction of tape movement of the tape for a recording and reproducing device. The magnetic gaps aligned in one straight line have at least two different gap widths.

The method of making the multi-channel dual-gap head is to provide a magnetic plate and join to it a plurality of grooved magnetic material blocks by means of spacers of various thicknesses. Thereafter, slots are cut at the joints between the blocks, and non-magnetic plates are inserted in the slots. The resulting assembly is trimmed appropriately and back cores are attached and connected to the head tips.

1 Claim, 11 Drawing Figures

INVENTORS
TAKASHI TANAKA
YASUO NOMURA

BY Wenderoth, Lind & Ponack
ATTORNEYS

INVENTORS
TAKASHI TANAKA
YASUO NOMURA

BY Wenderoth, Lind & Ponack
ATTORNEYS

INVENTORS
TAKASHI TANAKA
YASUO NOMURA

BY Wenderoth, Lind & Ponack
ATTORNEYS

MULTI-CHANNEL DUAL-GAP MAGNETIC HEAD

BACKGROUND OF THE INVENTION

1. Field of the Invention

This invention relates to a multi-channel dual-gap magnetic head and to a method for making such a multi-channel dual-gap magnetic head.

2. Prior Art

A conventional multi-channel dual-gap magnetic head is merely a combination of a plurality of elementary dual-gap magnetic heads which are magnetically separated from each other by non-magnetic materials such as metals, organic resins or ceramics. In such a construction it is important that all the magnetic gaps of this plurality of elementary magnetic heads be aligned in two straight lines for simultaneous recording and reproducing and for compatibility of different recording and reproducing devices. There has, however, been difficulty in aligning all the magnetic gaps of the elementary magnetic heads in two straight lines which are parallel to each other during manufacture of such a multi-channel dual-gap magnetic head. In addition, in a conventional multi-channel magnetic head having such a construction, there is difficulty in making the widths of the gaps aligned in one straight line different from each other. Therefore, there is no available multi-channel dual gap magnetic head having more than two different gaps aligned in one straight line. Such a magnetic head is desirable because it makes it possible for audio tape recorders to operate to automatically reverse the tape.

SUMMARY OF THE INVENTION

An object of the present invention is to provide a multi-channel dual-gap magnetic head in which all the magnetic gaps are aligned in two straight lines parallel to each other and the widths of the magnetic gaps aligned in one straight line are at least two different sizes.

Another object of the invention is to provide a multi-channel dual-gap magnetic head which causes very little cross talk between adjacent channels and has a high track density.

A further object of the invention is to provide a method for making a multi-channel dual-gap magnetic head in which all the magnetic gaps are aligned in two straight lines parallel to each other and the widths of the magnetic gaps aligned in one straight line are at least two different sizes.

The multi-channel dual-gap magnetic head according to the invention comprises a plurality of magnetic head tips which are separated magnetically from each other by non-magnetic materials and each having two magnetic gaps. A plurality of magnetic back cores are joined to said magnetic head tips, and each has a winding wound thereon. Said magnetic gaps are aligned in two straight lines which are perpendicular to the direction of tape movement through a recording and reproducing apparatus. The gap widths of said plurality of magnetic gaps aligned in one straight line are not equal.

These and other objects of the invention will be apparent from the following detailed description taken together with the accompanying drawings.

DESCRIPTION OF PREFERRED EMBODIMENTS

Figure 1A:
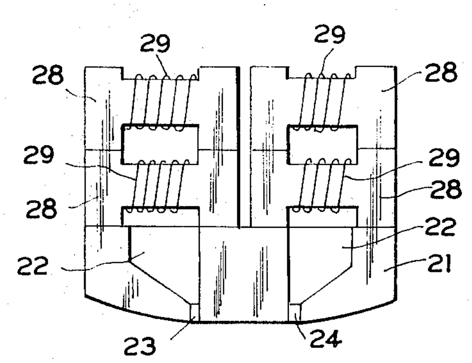
FIGS. 1*a*–1*d* are a plan view, a front elevation view, a side elevation view and a perspective view, respectively, of one embodiment of the multi-channel dual-gap magnetic head according to the present invention.
Figure 1B:
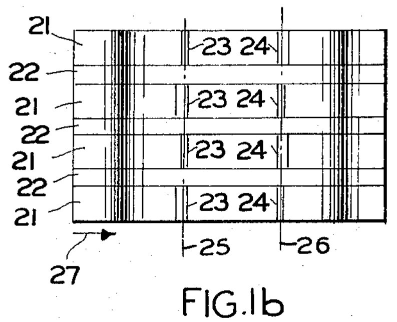
Figure 1C:
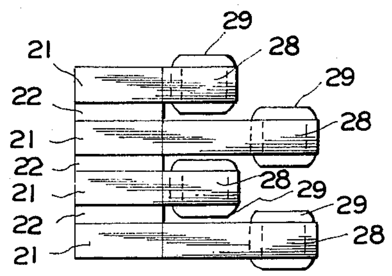
Figure 1D:
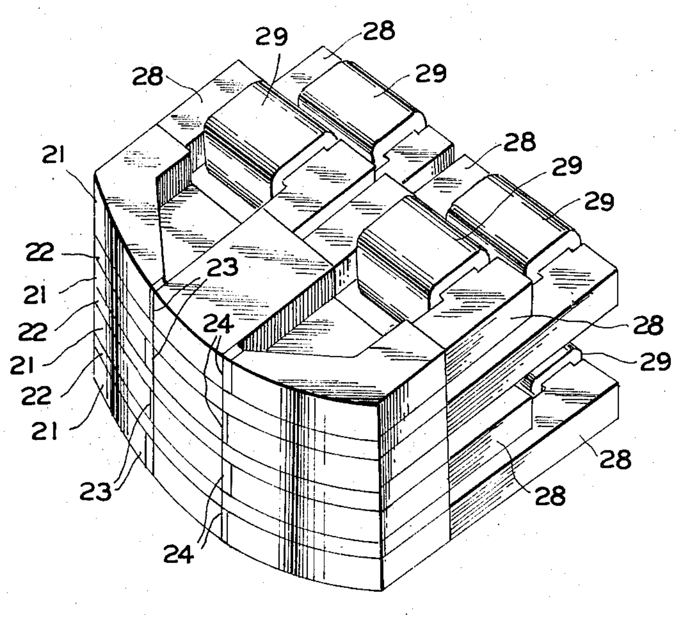

Referring to FIGS. 1*a*–1*d*, a plurality of magnetic head tips 21 are stacked in a stack and are separated magnetically from each other by layers 22 of non-magnetic material. Each of said plurality of magnetic head tips 21 has two magnetic gaps 23 and 24. All of said magnetic gaps 23 are aligned in a first straight line 25 perpendicular to the direction of tape movement as shown by an arrow 27. All of said magnetic gaps 24 are aligned in a second straight line 26 perpendicular to said direction of tape movement and parallel to said first line 25. The gap width of said magnetic gaps 23 or 24 are at least two different sizes. That is, each of said plurality of gaps has the gap width according to its purpose such as recording, reproducing or erasing. Each of said magnetic head tips 21 has two magnetic back cores 28 joined thereto. A winding 29 is wound on each of said back cores 28.

Figure 2A:
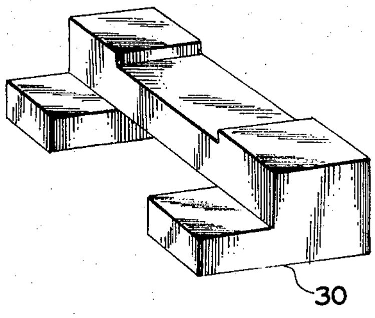
FIGS. 2*a* and 2*b* are perspective views of other embodiments of the back cores used for the multi-channel dual-gap magnetic head according to the present invention.
Figure 2B:
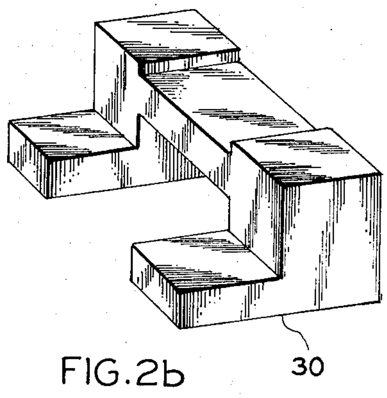
Figure 3:
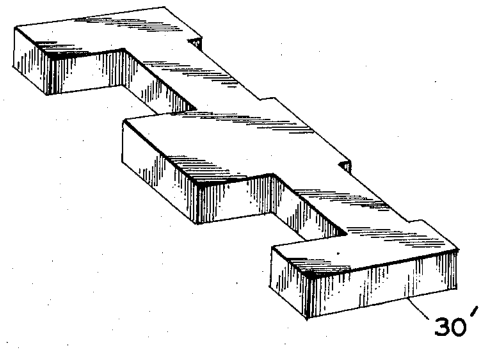
FIG. 3 is a similar view of another embodiment.

In the embodiment of FIGS. 1*a*–1*d* the windings 29 are spaced from each other by using two different shapes of the back cores 28, one of which has longer legs than the other. As a result, cross talk is reduced. It is possible for each of said magnetic back cores to have other shapes than those shown in FIGS. 1*a*–1*d*, such as shown in FIGS. 2*a* and 2*b*, in order to provide a sufficient spacing between windings and in order to reduce the cross talk. In the embodiments shown in FIGS. 2*a* and 2*b*, the back cores 30 are bent upwardly out of the plane of the magnetic head tip. Thus, when the back cores 30, for example, are used instead of the back cores 28 for the first head tip 21, the windings on the back cores 30 are spaced from those on the back cores 28 for the second head tip 21 in the direction of the stacking of the magnetic head tips 21, so as to be at a greater distance than the windings 29 of FIGS. 1*a*–1*d*. The two back cores for each elementary head tip 21 can be combined into one body 30, as shown in FIG. 3.

Clearly other permutations and combinations of these and similar arrangements are possible and will be apparent to those skilled in the art.

Figure 4:
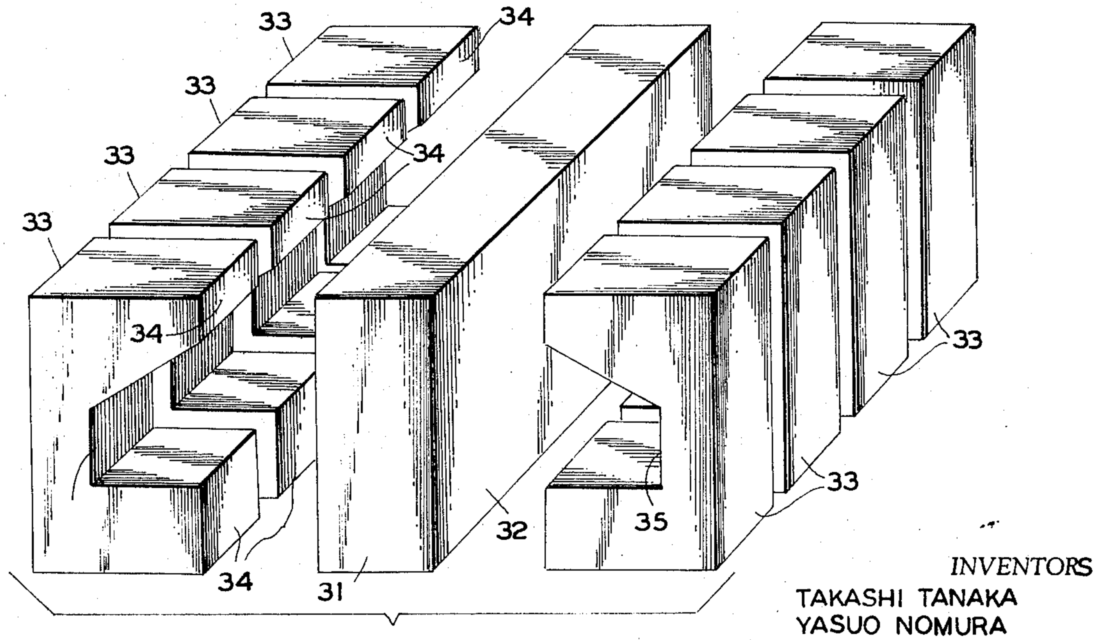
FIGS. 4 to 7 are perspective views showing the method of making a multi-channel magnetic head according to the invention.

The above-mentioned multi-channel dual-gap magnetic head is made by the following process. Referring to FIG. 4, the first step is to provide a magnetic plate 31 having major opposite surfaces 32 (only one surface 32 is visible in the drawing) which are smoothly polished and are parallel to each other.

The second step is to provide a plurality of parallelepipeds 33 of magnetic material, each of which has one surface 34 smoothly polished and each having at least one groove 35 on the polished surface 34. It is preferable that the smoothness of said surfaces 32 of said magnetic plate 31 and said surfaces 34 of said magnetic parallelepipeds 33 be such that the irregularities project less than 1 micron, because two of these Surfaces opposed to each other will then form a magnetic gap which at the most has a width less than several microns.

Figures 5, 6, 7:
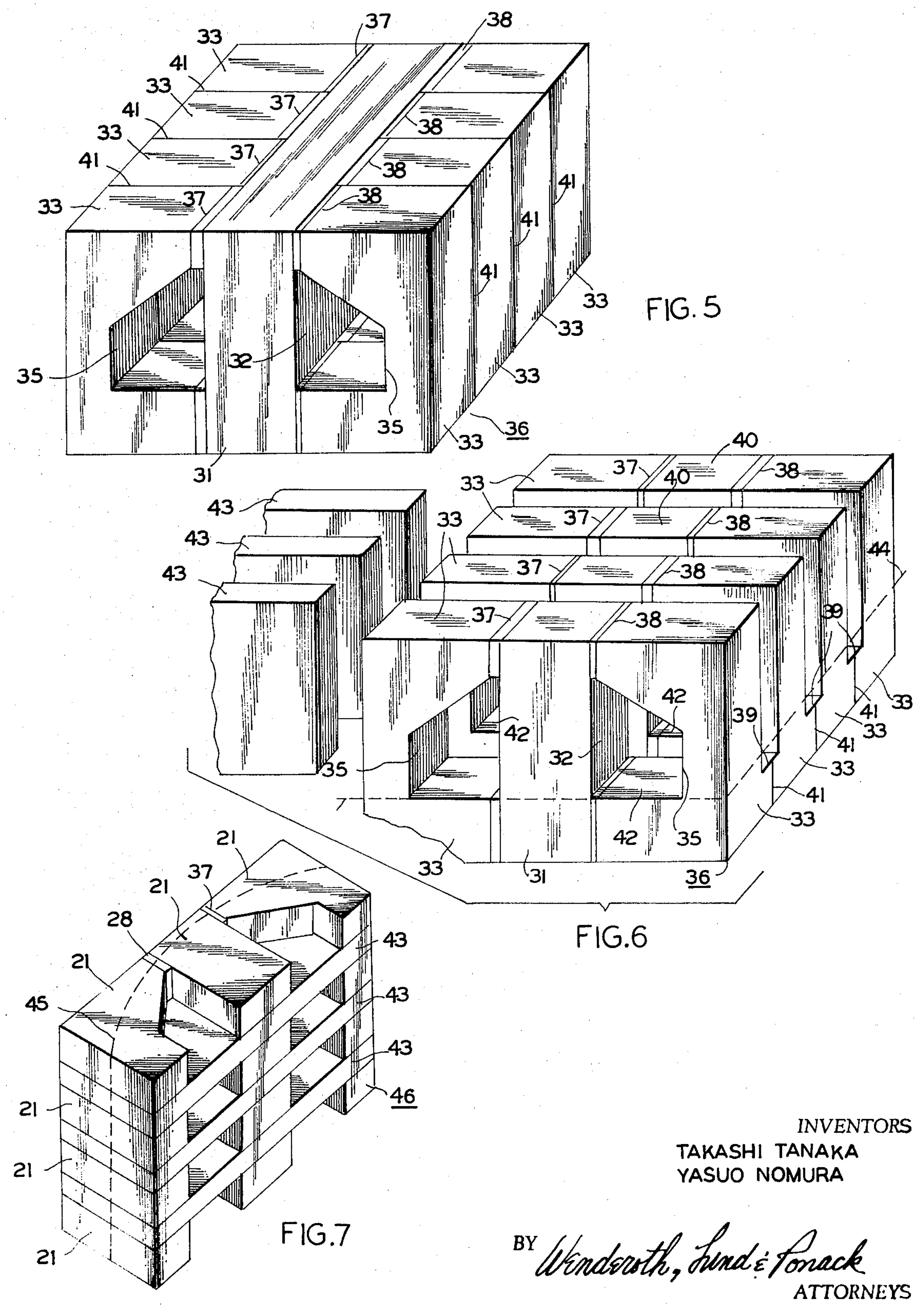

The third step is to form a composite body 36, as shown in FIG. 5, with the groved surfaces 34 of the magnetic material parallelepipeds 33 joined to said two major surfaces 32 of said magnetic plate 31 by spacers of various thicknesses. Each of the gaps 37 in one line of gaps and each gap 38 in the other line of gaps can have different width from the other gaps in the line according to its purpose. The gap widths are governed by the thickness of the spacers such as metallic foils which have suitable thicknesses for the desired gap widths.

The fourth step is to cut slots 39 having a parallelepipedal form and which are perpendicular to both the edge surfaces 40 and major surfaces 32 of said magnetic plate 31. Slots 39 are cut at each boundary line 41 between magnetic material parallelepipeds 33. Each of said slots 39 has a width corresponding to the space between adjacent tracks on a tape and a depth extending into the material of the magnetic material parallelepipeds 33 beyond the remote side wall plane 42 of grooves 35 as shown in FIG. 6. It is possible to provide slots at other locations than at said boundary lines 41 in addition to said slots 39 at said boundary lines 41.

The fifth step is to insert into said slots 39 non-magnetic plates 43 having essentially the same size as said slots 39, and to adhere said non-magnetic plates 43 to said composite body 36.

The sixth step is to cut the resultant composite body in a plane 44, shown by broken lines in FIG. 6, which is parallel to said edge surfaces 40 of said magnetic plate 31 and which is essentially coincident with the bottom plane 42 of said grooves 35 so that the part of composite body 36 having said grooves 35 therein forms a stack of head tips 21 separated magnetically from each other by said non-magnetic plates 43. Said stack of head tips 21 is shown in FIG. 7. Each of said plurality of tip cores 21 consists of said magnetic plate 31 and the remaining portion of the magnetic material parallelepipeds 33 of FIG. 5. Said non-magnetic plates 43 of FIG. 7 correspond to the non-magnetic material 22 of FIGS. 1*a*–1*d*. The front surface having the magnetic gaps 37 and 38 therein is formed into a curved surface by removing material to the broken line 45 in FIG. 7.

It is preferable that all the members of said resultant composite body 46 shown in FIG. 7 be made of similar kinds of materials with respect to their wear resistance. For example, when said magnetic plate 31 and said magnetic material parallelepipeds 33 are made of oxides such as Mn–Zn ferrite, said non-magnetic plates 43 can be made of ceramics such as Zn-ferrite. The Mn–Zn ferrite bodies and Zn-ferrite bodies are adhered together by glass which fills magnetic gaps 37 and 38. When said magnetic plate 31 and said magnetic parallelepipeds 33 are made of metal such as permalloy, then said non-magnetic plates 43 of said magnetic gaps 37 and 38 can be of material such as bronze.

The seventh step is to join a plurality of magnetic back cores 28 having windings 29 thereon to said plurality of magnetic head tips 21, as shown in FIGS. 1*a*–1*d*, using any available and suitable adhesive. It is not necessary that said magnetic back cores 28 be made of the same material as the magnetic head tips 21.

According to the method of this invention, a multi-channel dual-gap head can be made of magnetic and nOn-magnetic ferrites so that the head has a very long life.

From the above-described production method of this invention, it is clear that the gaps of the novel multi-channel dual-gap magnetic head are very straight and parallel.

What is claimed is:

1. A method of making a multi-channel dual-gap magnetic head comprising, in the recited order, the steps of:

1. providing a magnetic plate having edge surfaces and having major opposite surfaces perpendicular thereto, which are smoothly polished and are substantially parallel to each other;
2. providing a plurality of magnetic material parallelepipeds on each side of said magnetic plate, each of which has one surface smoothly polished and has at least one groove in said polished surface;
3. inserting spacers of magnetic gap material between the grooved surfaces of said parallelepipeds and the surfaces of said magnetic plate, the spacers for adjacent parallelepipeds having different thicknesses, and joining said plurality of magnetic material parallelepipeds at the grooved surfaces to said two opposite surfaces of said magnetic plate by means of said spacers, said spacers acting as magnetic gaps;
4. cutting slots having a parallelepipedal form perpendicular to both the edge surface and the major surfaces of said magnetic plate at least at each of the boundary lines between said magnetic material parallelepipeds, said slots each having a width corresponding to a space between adjacent tracks on a tape and a depth extending from one edge surface of said magnetic plate and the corresponding surfaces of said magnetic material parallelepipeds to the remote side wall plane of said grooves in said magnetic material parallelepipeds;
5. inserting into said slots non-magnetic plates having essentially the same size as said slots;
6. cutting the resultant composite body at said remote side wall plane parallel to said edge surfaces of said magnetic plate to form a stack of a plurality of head tips separated magnetically from each other by said inserted non-magnetic plates; and
7. joining a plurality of magnetic back cores having windings thereon to the respective head tips.

* * * * *